May 17, 1932.  J. ARMSTRONG  1,858,725
HUMIDIFYING SYSTEM
Filed Sept. 4, 1929
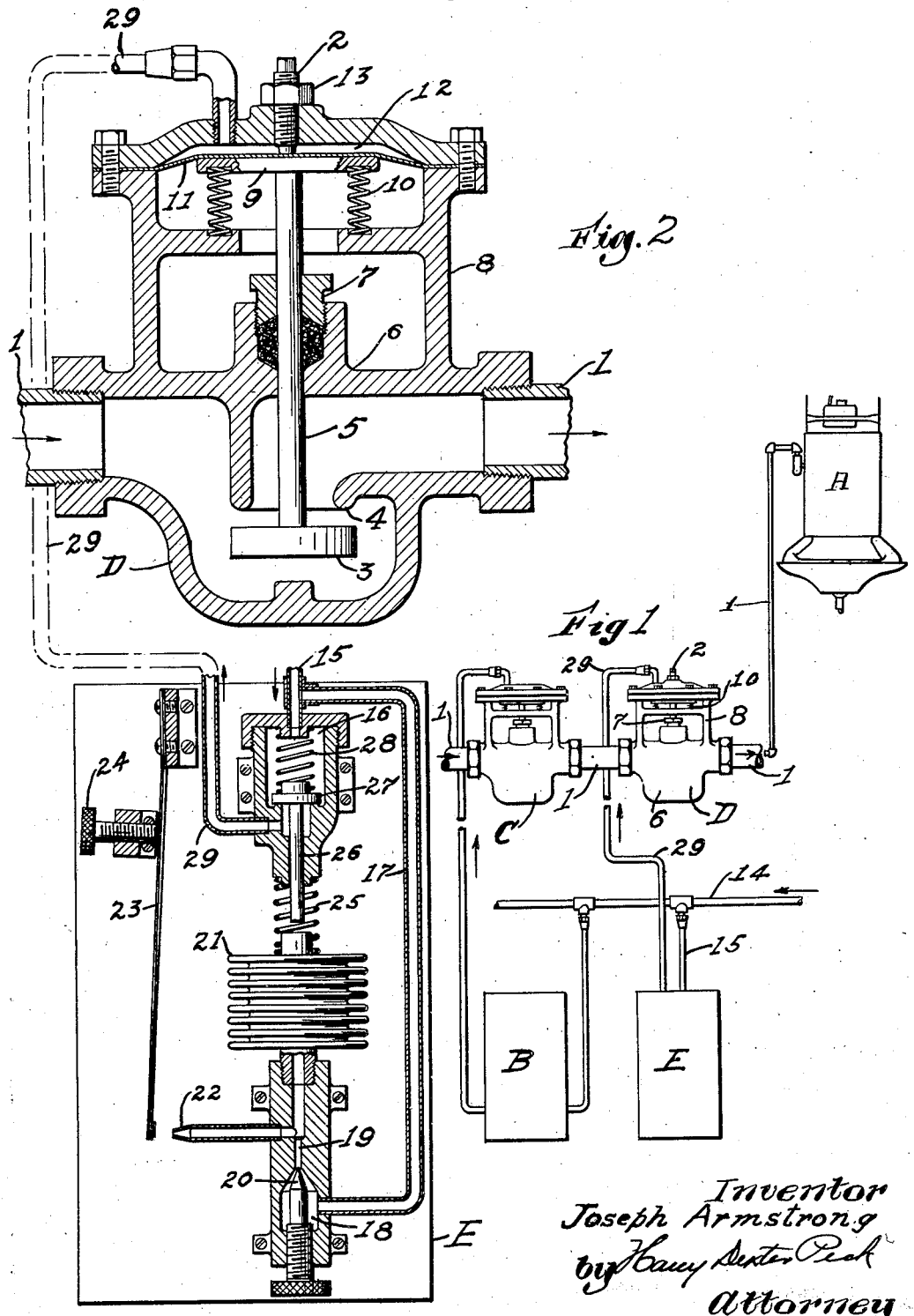
Inventor
Joseph Armstrong
by Harry Dexter Peck
Attorney Patented May 17, 1932

1,858,725

UNITED STATES PATENT OFFICE

JOSEPH ARMSTRONG, OF CONIMICUT, RHODE ISLAND, ASSIGNOR TO AMERICAN MOISTENING COMPANY, OF PROVIDENCE, RHODE ISLAND, A CORPORATION OF MAINE

HUMIDIFYING SYSTEM

Application filed September 4, 1929. Serial No. 390,412.

This invention relates to improvements in humidifying systems. More especially it has to do with control apparatus for such a system whereby the water supplied thereto may be at all times be controlled in accordance with the relative humidity and may at other times be definitely restricted to a certain limit when the tempearture is below a selected degree.

The customary control for humidifying systems is actuated by a sensitive element which responds to humidity conditions of the room being treated. This element is placed in a location whose atmosphere is believed to represent the average or mean condition of the room as a whole. Obviously the regions in the immediate vicinity of the several humidifiers are usually more humid than those farther way but in the course of a day's run, after the normal condition of the atmosphere has been established, the humidity responding element maintains that condition within a range deemed satisfactory. In the early hours of the day however, when the operations of the room are started, including the humidifying system, it has been found that the atmosphere close by the humidifiers becomes supersaturated before the air bathing the sensitive element acquires sufficient humidity to actuate the control apparatus. This undesirable situation results from the fact that in the morning after a plant has been shut down overnight the temperature is low and there is less actual humidity in the air than is normally present during the day. Since the quantity of moisture which air can carry without becoming supersaturated is dependent upon the temperature of that air, it follows that when the humidifying system is started at the relatively low temperature of the room the region in the immediate vicinity of each humidifier is quickly raised to the saturation point. And because the air in general has a comparatively low humidity content the dissemination of the humidifiers is largely taken up before it reaches the sensitive control element. By the time the latter does respond to the rising humidity the air about the humidifiers has passed the saturation point and precipitation of water particles has begun. This is always undesirable and in some instances, as where delicate fabrics are in process of manufacture, the falling of even a single drop of water may cause considerable damage. The avoidance of this evil has been the subject of much consideration by manufacturers and by inventors.

An object of the present invention is to provide automatic apparatus which will restrict the water supply of the humidifiers to a definite limit while the temperature of the room being treated is below a selected degree, and which will remove the restriction when this degree is reached. It is a feature of the invention that the system is simultaneously controlled by the humidity responsive apparatus so that whether operating or not under the restriction aforesaid, the supply will be shut off whenever the desired percentage of relative humidity is attained. It is also an object to provide apparatus which is simple, inexpensive and reliable, and which can be easily added to an existing system.

The best mode in which I have contemplated applying the principles of this invention is shown in the accompanying drawings but these are merely illustrative and it is intended that the patent shall cover by suitable expression in the appended claims whatever features of patentable novelty exist in the invention as a whole.

In the drawings:

Figure 1 is a somewhat diagrammatic showing of a portion of a humidifying system embodying the present invention; and Figure 2 is an elevation, partly in section, of the units by which the temperature control is effected.

Referring to the drawings, the pipe 1 represents the feed line leading to one or more humidifiers A whose moisture discharge is to be controlled. Usually this control is exercised by a humidity-responsive apparatus, represented in the drawings by the rectangle B, which admits or shuts off air from the diaphragm chamber of a control valve C located in the pipe 1. When the relative humidity of the atmosphere is below the predetermined percentage for which the apparatus B is set, the valve C is wholly open and ordinarily the humidifiers would then be discharging at maximum capacity. If this occurs in the early morning before the plant has had time to warm up to the normal working temperature, the said discharge will frequently cause undesirable and possibly damaging precipitation in the immediate vicinity of the humidifiers before the controller B acts to shut off valve C. And this may occur repeatedly as the humidifiers are intermittently operated until such time as the general room temperature has reached the stage where the maximum output of the humidifiers can safely be absorbed.

The purpose of the invention is to augment the humidity control of the system by a temperature control thereof during that period of the day when the room temperature is relatively low. This is accomplished by inserting in the supply pipe 1 a second valve D and providing temperature responsive apparatus E to control it. This valve D and its controller E are shown in more detail in Figure 2.

The valve D is similar in all respects to valve C except that the former is provided with a throttling screw 2 by which the movement of the valve proper 3 toward its seat 4 can be limited. The valve stem 5 projects upward from the casing 6 through a suitable packing gland 7 and open frame 8 on the top of the casing to a plate 9 to which the stem is secured. This plate is supported on a series of springs 10 which constantly urge it and the valve upward in conjunction with the flow through the casing which also tends to seat the valve. Above the plate 9 is a diaphragm 11 forming the lower wall of an expansion chamber 12 at the top of the valve. When this chamber is under atmospheric pressure, as will be more particularly hereinafter described, the diaphragm is flexed upward, as shown in Figure 2, until it rests against the screw 2. This screw is set and locked by nut 13 in such position that the valve 3 will not completely close but will be held near enough to its seat to throttle or cut down the flow of water through pipe 1 to the humidifiers. The quantity thus allowed to pass is less than the amount which the humidifiers can handle when working at maximum capacity, and it follows that while the valve 3 is held in throttled position the output of the humidifier is definitely limited. By a proper setting of the screw 2, this limited output can be held to that quantity which the air at low room temperatures can safely entrain or obsorb without precipitation. When the temperature of the room is high enough to permit the humidifiers to operate safely at full capacity, the valve 3 is automatically opened wide and continues so as long as the temperature remains up.

The automatic opening of the valve 3 is accomplished by the control unit E. This is connected to the compressed air line 14 by a pipe 15 which leads both to a valve chamber 16 and, through pipe 17, to a restriction chamber 18. The outlet 19 from the latter is controlled by a restriction valve 20, and leads to a siphon bellows 21 and to an escape vent 22. The discharge capacity of this vent is fixed but is always greater than the flow capacity past the restriction valve 20, due to the setting of the latter. When the vent 22 is opened, air from the supply 14 passes through pipes 15 and 17, past the restriction valve 20 and out the vent without affecting the siphon bellows. This is the condition which exists when the room temperature is below a selected degree. Under such conditions the water control valve 3 is in throttling position as illustrated in Figure 2.

As the temperature of the room rises it affects a thermostatic bar 23 which is anchored at one end to the panel of the control E so that its free end can move toward or from the vent 22. By means of the adjusting screw 24, the bar can initially be set so that its movement toward the vent 22 will be completed when the temperature reaches a selected degree. This cuts off the escape of air flowing past the restriction valve 20 and causes this air to enter the siphon bellows 21. The latter is fixed at its base and must expand upward against the coiled spring 25. In its movement, which is very rapid, it encounters the stem 26 of valve 27 which is yieldingly held to its seat by spring 28 in chamber 16. The lifting of this valve 27 by the expanding bellows opens a passage through its seat to pipe 29, which extends upward and connects with the expansion chamber 12 at the top of valve D. Air under pressure then flows from pipe 14 through pipe 15, chamber 16 and pipe 29, and acts upon the diaphragm 11 to overcome the force of springs 10 and the flowing water on valve 3. The latter valve is thus opened wide and full flow through pipe 1 is thereafter permitted wherever valve C is opened by the humidity-control apparatus B.

It is to be noted that in the normal operation of a humidity system, the humidifiers are discharging only intermittently and that during their periods of discharge their output is at maximum capacity. In the intervals between discharge their output of moisture is zero. Accordingly, when the throttle valve 3 is partly closed, as heretofore described, the output of the humidifiers is below maximum capacity in order that the amount of moisture actually thrown into the air may not cause precipitation. But this does not mean that an insufficient amount of moisture is delivered to the air to maintain the desired humidity, because while the throttle valve D is partly closed the periods of discharge are of longer duration and the intervals of zero discharge shortened. As a consequence the total discharge is enough to maintain the desired humidity but because of the control exercised by the unit E when the temperature is below a certain degree, this total discharge is permitted to enter the air only in such quantity as the air at that temperature can safely handle without precipitation.

When the plant closes down at night, the humidifying system is shut off. As the temperature falls below the point at which the thermostatic valve closes the vent 22, the bar flexes away from the vent so that air escapes from the bellows 21. The latter then collapses under the combined action of springs 28 and 25 until the valve 27 seats, after which further downward movement of the bellows is caused by spring 25 alone. There is sufficient leakage past the stem 26 to permit the air in expansion chamber 12 and pipe 29 to escape gradually and allow the springs 10 to flex the diaphragm 11 upward and move the valve 6 to throttling position. Thus the valve D is automatically reset for the morning hours when its effect on the system is desired.

Although the present invention has been described and illustrated as having the valve D close by the valve C and thereby controlling all the humidifiers beyond fed by pipe 1, it is obvious that the valve D may be otherwise located so that its control will be centralized upon one or more humidifiers where precipitation is dangerous, thus leaving other humidifiers free at all times to run at full capacity if preferred.

The application of the principles of invention may be amplified by having more than one throttling valve in a line, each such valve being set to open wide at different selected temperatures. Thus at very low temperatures, the most throttled valve would govern the supply. When the temperature had risen sufficiently to open this valve a second valve, set to open at a higher selected degree, would take up the burden of control until its actuating temperature was reached. And so on, the series of valves thus making possible a step-by-step control during a considerable range of rising temperature.

Furthermore the principles of the invention are not limited in their application to humidifying systems but may be incorporated in other kinds of systems where restricted flow of fluid is desired when the temperature is below a certain degree.

I claim:

1. A humidifying system comprising, in combination, a humidifier; a water supply therefor; a pair of valves controlling the flow in said supply, one of said valves being adapted when moved to travel continuously between wide open and closed positions and the other valve being adapted when moved to travel continuously between wide open and a partly-closed position; separate power actuated means for moving each valve; a source of power; humidity-responsive apparatus controlling the flow of power to effect said continuous travel of the first said valve; and thermally responsive apparatus controlling the flow of power to effect the said continuous travel of the second said valve.

2. A humidifying system comprising, in combination, a humidifier; a water supply line therefor; a power actuated valve in said line adapted when moved to travel continuously between wide open and closed positions; a source of power apparatus adapted upon a predetermined change of humidity to control the power flow from said source to said valve and thereby effect its said continuous travel; another valve in said supply line adapted when moved to travel continuously between wide open and a partly closed position; and apparatus adapted upon a predetermined change in temperature to control the power flow from said source to said other valve and thereby effect its said continuous travel.

3. A humidifying system comprising, in combination, a humidifier; a water supply therefor; a plurality of valves controlling said supply one of said valves being adapted when moved to travel continuously between wide open and closed positions and the other of said valves being adapted when moved to travel continuously between wide open and a partly closed position; separate power actuated means for moving said valves; a source of power; humidity-responsive apparatus controlling the flow of power to the means effecting continuous movement of the first said valve; and thermally responsive apparatus controlling the flow of power to the means effecting continuous movement of the other of said valves.

Signed at Providence, Rhode Island, this 16th day of August, 1929.

JOSEPH ARMSTRONG.